Patented Feb. 9, 1954

2,668,859

UNITED STATES PATENT OFFICE 2,668,859

PROCESS FOR THE PRODUCTION OF PHENOL AND ACETONE

Igor Scriabine, Lyon, France, assignor to Societe des Usines Chimiques Rhone Poulenc, Paris, France No Drawing. Application January 2, 1952, Serial No. 264,679

Claims priority, application France January 10, 1951

10 Claims. (Cl. 260—593)

The present invention relates to a process for the production of phenol and has for its object to provide a process for the production of phenol in which acetone is obtained as a useful byproduct.

It is known that alkyl-aromatic hydroperoxides can be decomposed into phenols and carbonyl compounds, the latter being ketones or aldehydes according to the alkyl radical by which the aromatic nucleus is substituted.

In the processes hitherto described the fission of the alkyl aromatic hydroperoxide is effected in the presence of catalysts having an acid reaction. Hock and Lang, Ber. 77, page 257 (1944), uses sulphuric acid for this purpose. They describe in particular the fission of cumene hydroperoxide into phenol and acetone and that of diphenylmethane hydroperoxide into phenol and benzaldehyde by heating in 10% sulphuric acid, and also describe the fission of tetraline hydroperoxide into o-hydroxyphenylbutyric acid (with the intermediate formation of hydroxyphenylbutyric aldehyde) in alcoholic solution by means of concentrated sulphuric acid. Wieland and Maier, Ber. 64, page 1205 (1931) have found that when triphenylmethyl hydroperoxide is treated with benzoyl chloride in various organic media, fission into phenol and benzophenone is effected.

It has now been found that the fission of cumene hydroperoxide into phenol and acetone can be effected with good yields by employing non-acidic catalysts chosen from among the solid elements of sub groups $b$ of groups V and VI of the periodic table of the elements. Of these elements, sulphur and phosphorus give the best results, while selenium and arsenic are effective at lower yields.

The non-acidic catalysts employed in accordance with the present invention exert no corrosive action on the plant in which the process is carried out. Moreover, they cannot in any circumstances act as condensation agents between the products of reaction, i. e. phenol and acetone, so that the formation of undesirable resinous by-products is avoided.

Cumene hydroperoxide may be prepared by methods known in the literature, e. g. oxidising cumene by the method of Hock and Lang, referred to above, if necessary under heat and pressure. It may be employed in solution in an organic solvent, which latter may be the excess cumene in which it has been formed. If it is desired to employ an isolated hydroperoxide, the separation may be effected either by distilling off the cumene, or by extracting the hydroperoxide with concentrated caustic soda.

The catalyst is employed, for example, in the form of powder, in solution or in suspension in a liquid which may be the same as the solvent for the cumene hydroperoxide. The operation is preferably carried out at such a temperature that the acetone formed during the reaction can escape, for example at the boiling temperature of the solvent, which can be regulated by maintaining a vacuum on the plant. The exothermic fission reaction generally starts rapidly and is controlled by boiling the solvent under reflux. When the reaction is finished, the solvent and the phenol are distilled.

The following examples, in which the parts are by weight, illustrate a number of methods of carrying the invention into effect, but are not to be regarded as limiting the invention in any way:

Example I 260 parts of ethyl benzene containing 3.5 parts of sulphur are brought to boiling point under a pressure of 253 mm. of mercury (98° C.). A solution of 369 parts of cumene hydroperoxide is separately prepared in 998 parts of ethyl benzene, and 100 parts thereof are run into the boiling ethyl benzene. After eight minutes the reaction starts and the acetone formed distils.

The remainder of the cumene hydroperoxide solution is run in over a period of 25 minutes, whereafter the boiling is maintained under reflux for 25 minutes and the product is then distilled. 110 parts of acetone are withdrawn, which represents a yield of 80% of the theory, and 194 parts of phenol, that is, a yield of 85%.

Example II

Cumene is oxidised by the method described by Hock and Lang, referred to above, so as to obtain a solution of 500 parts of cumene hydroperoxide in 930 parts of cumene. 100 parts of this solution are run into cumene brought to boiling point under a pressure of 210 mm. of mercury (108°–110° C.) and containing 2.5 parts of sulphur. The reaction starts in 15 minutes. The remainder of the hydroperoxide solution is then run in over a period of 21 minutes, and heating is carried out for a further 40 minutes. All the hydroperoxide is decomposed. 143 parts of acetone and 232.6 parts of phenol are obtained.

Example III

The operation is carried out as in Example II with the same quantities, except that the 2.5 parts of sulphur are replaced by 5 parts of white phosphorus. 132.5 parts of acetone and 215.1 parts of phenol are obtained.

Example IV

The operation is carried out as in Example III with the same quantities, except that the sulphur is replaced by 5 parts of powdered selenium (99% pure). 40 parts of acetone and 110 parts of phenol are obtained.

Example V

The operation is carried out as in Example III with 1045 parts of a solution of 366 parts of cumene hydroperoxide in cumene in the presence of 10 parts of finely divided arsenic. 85 parts of acetone and 160.6 parts of phenol are obtained.

I claim:

1. A process for the simultaneous preparation of phenol and acetone by fission of cumene hydroperoxide which comprises heating cumene hydroperoxide under substantially anhydrous conditions in the presence of a catalyst which is a solid element of one of the sub-groups *b* of groups V and VI of the periodic table of the elements.

2. A process for the simultaneous preparation of phenol and acetone by fission of cumene hydroperoxide which comprises heating cumene hydroperoxide under substantially anhydrous conditions in the presence of sulphur catalyst.

3. A process for the simultaneous preparation of phenol and acetone by fission of cumene hydroperoxide which comprises heating cumene hydroperoxide under substantially anhydrous conditions in the presence of phosphorus as catalyst.

4. A process for the simultaneous preparation of phenol and acetone by fission of cumene hydroperoxide which comprises heating cumene hydroperoxide under substantially anhydrous conditions in the presence of selenium as catalyst.

5. A process for the simultaneous preparation of phenol and acetone by fission of cumene hydroperoxide which comprises heating cumene hydroperoxide under substantially anhydrous conditions in the presence of arsenic as catalyst.

6. A process for the simultaneous preparation of phenol and acetone by fission of cumene hydroperoxide which comprises heating cumene hydroperoxide under substantially anhydrous conditions in the presence of a catalyst which is a solid element of one of the sub-groups *b* of groups V and VI of the periodic table of the elements and in the presence of a solvent for the cumene hydroperoxide.

7. A process for the simultaneous preparation of phenol and acetone by fission of cumene hydroperoxide which comprises heating cumene hydroperoxide under substantially anhydrous conditions in the presence of a catalyst which is a solid element of one of the sub-groups *b* of groups V and VI of the periodic table of the elements and in the presence of free cumene as solvent for the cumene hydroperoxide.

8. A process for the simultaneous preparation of phenol and acetone by fission of cumene hydroperoxide which comprises heating cumene hydroperoxide under substantially anhydrous conditions in the presence of a catalyst which is a solid element of one of the sub-groups *b* of groups V and VI of the periodic table of the elements, distilling off the acetone formed and separating phenol from the residue obtained.

9. A process for the simultaneous preparation of phenol and acetone by fission of cumene hydroperoxide which comprises heating cumene hydroperoxide under substantially anhydrous conditions in the presence of a catalyst which is a solid element of one of the sub-groups *b* of groups V and VI of the periodic table of the elements and in the presence of free cumene as solvent for the cumene hydroperoxide, distilling off the acetone formed and separating phenol from the residue obtained.

10. A process for the simultaneous preparation of phenol and acetone by fission of cumene hydroperoxide which comprises heating cumene hydroperoxide under substantially anhydrous conditions in the presence of a catalyst which is a solid element of one of the sub-groups *b* of groups V and VI of the periodic table of the elements, distilling off the acetone formed under reduced pressure and separating phenol from the residue obtained.

IGOR SCRIABINE.

References Cited in the file of this patent

UNITED STATES PATENTS

| Number | Name | Date |
|---|---|---|
| 2,484,841 | Lorand | Oct. 18, 1949 |
| 2,557,968 | Hulse | June 26, 1951 |